Feb. 14, 1961 T. H. OLDING 2,971,362
WASHING MACHINE FILTER
Filed Jan. 2, 1958 3 Sheets-Sheet 1

INVENTOR.
THOMAS H. OLDING
BY
ATTORNEY

INVENTOR.
THOMAS H. OLDING
BY
ATTORNEY

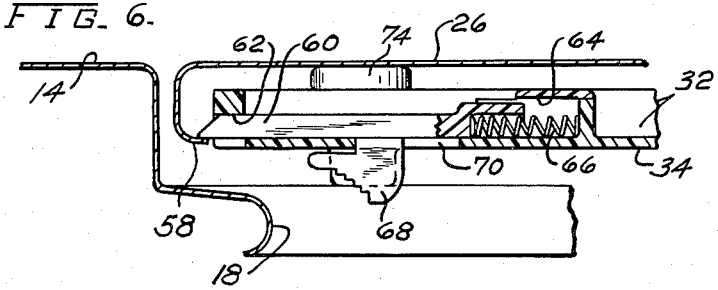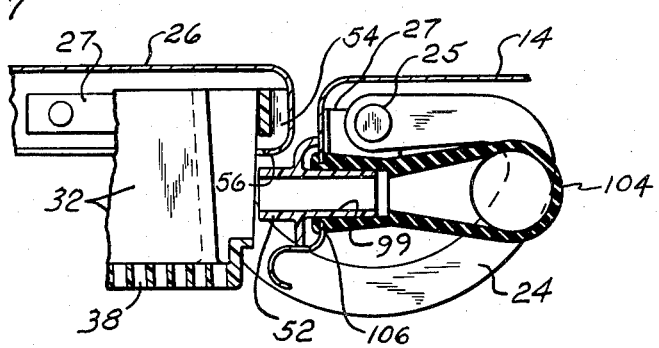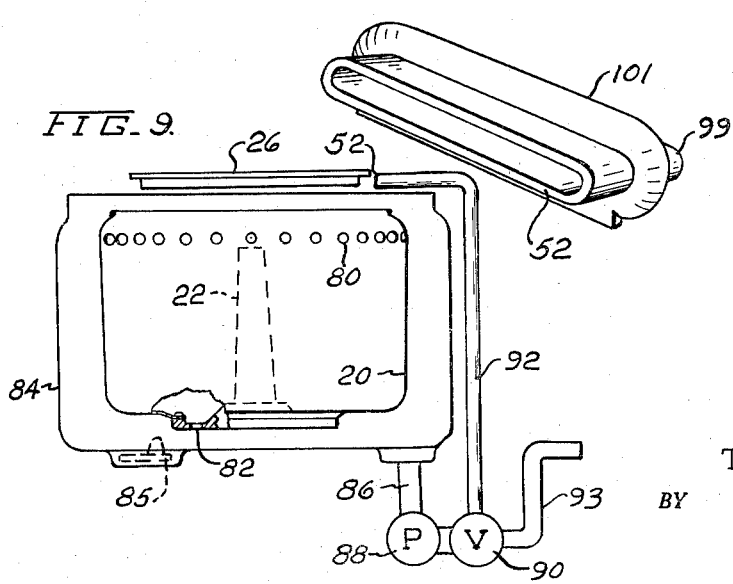

_United States Patent Office_

2,971,362
Patented Feb. 14, 1961

2,971,362
WASHING MACHINE FILTER

Thomas H. Olding, Cincinnati, Ohio, assignor to The Murray Corporation of America, Syracuse, N.Y., a corporation of Delaware Filed Jan. 2, 1958, Ser. No. 706,616

10 Claims. (Cl. 68—18)

This invention relates to washing machines, and more particularly to filters for removing lint and other foreign matter by recirculation of wash water through a filter.

In automatic washers it is desirable to remove lint and other foreign matter from the sudsy wash or rinse water, as the washing action progresses. For this purpose, the wash water is continuously recirculated by means of a pump, and caused to pass through a lint screen capable of removing lint, foreign matter and the like. Lint screens of the type referred to must be located so as to be readily accessible for frequent cleaning and yet adequate screening area must be provided. Suitable safeguard against stoppage of flow is necessary should there be failure to clear the screen of accumulated lint with sufficient frequency. In addition, such screens should preferably be so located as to be out of the way, so as not to interfere with the normal loading or unloading of the washing machine.

The present invention is directed to a lint catcher or screen which nests within the access lid of a washing machine, so that when the lid is closed, the lint screen is operatively disposed to intercept recirculated wash water, and allow the water to percolate back into the wash tub, after removal of lint and foreign matter. The arrangement is such that when the lid is opened, the screen is tipped with the lid so as to be completely out of the way to provide free access to the washer to load and unload, or add detergent and the like as is necessary. The invention is further directed to the provision of a filter grid, which is readily positioned and locked within the lid, or readily removed therefrom for cleaning. Further, such grid is light in weight, readily molded of plastic or the like, and so located when in operative position, as to clear the agitator and all other working parts and utilize what would otherwise be regarded as a waste space.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 6 is a fragmentary sectional view through the latch mechanism taken substantially on the line 6—6 of Figure 4;

Figure 7 is an enlarged sectional view through the water inlet connection to the lint filter, taken substantially on the line 7—7 of Figure 4;

Figure 8 is a perspective view of the inlet nozzle; and

Figure 9 is a schematic diagram of the recirculating wash fluid connections employed in respect to the filter grid.

Figure 1:
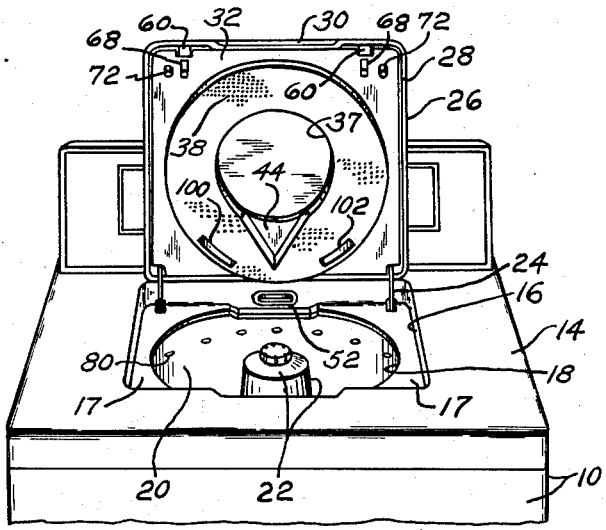
Figure 1 is a perspective front view of an automatic washer with the lint filter grid in place within the open lid.

Referring to Figure 1 there is shown a vertical axis agitator washing machine of the centrifugal extractor top loading type with a central oscillatory agitator. As shown, the cabinet 10 is provided with a deck 14 having a substantially square depressed access opening and cover well 16 formed therein. The cover well is provided with a large circular access aperture 18 which is in substantial alignment with the vertical axis of the wash tub 20 and the center post and agitator 22. Hinged to the underside of the tub deck 14 as by arcuate hinge arms 24 pivoted as at 25, on brackets 27, is a cover 26 of generally square configuration, such cover having a narrow depending marginal flange or skirt 28 extending clear around the lid, such skirt having an inturned flange as at 56 along its lower edge. The skirt is provided with a finger recess 30 adjacent a finger access depression 31 in the deck adjacent the forward edge of the cover well.

Figure 2:
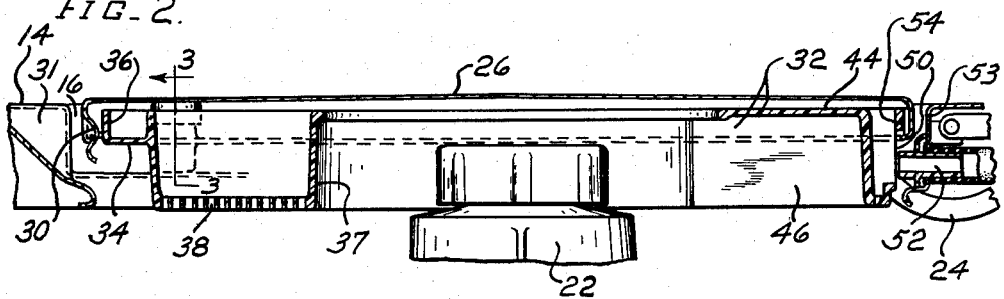
Figure 2 is a fore and after sectional view taken through the lid and grid when lowered to operative position, in flush relation to the washer cabinet top.
Figure 3:
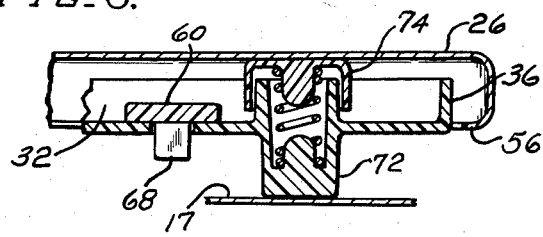
Figure 3 is an enlarged sectional fragmentary detail taken on line 3—3 of Figure 2.
Figure 4:
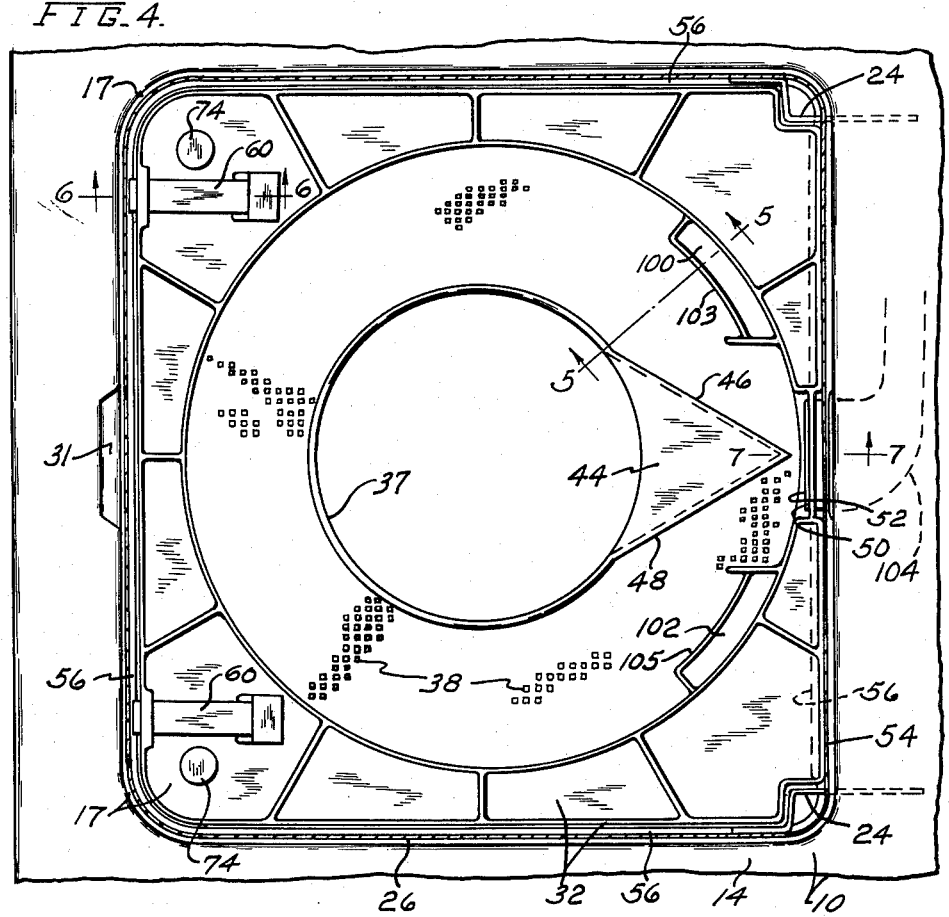
Figure 4 is a top plan view of the filter grid, within the lid, the lid being cut away.
Figure 5:
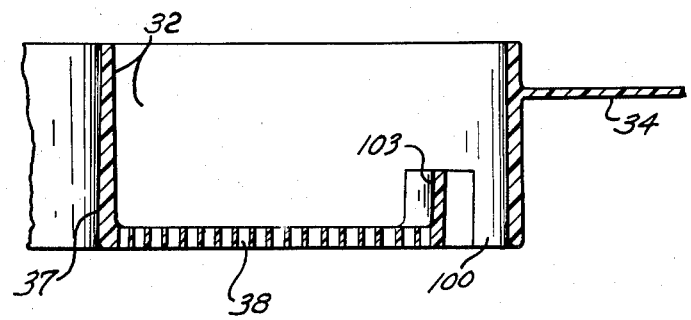
Figure 5 is an enlarged sectional view taken on the line 5—5 of Figure 4.

During the normal operation of the washing machine the lid 26 is closed and takes the position shown in Figure 2. In order to provide a lint filter which may be interposed in a recirculating wash water system and in order to effectively utilize the waste space immediately inside and beneath the lid 26, there is provided a shallow molded lint filter grid 32, the upper marginal portion 34 of which is adapted to nest within the lid 26. The lint filter grid comprises a molded plastic member having an annular trough with a perforate bottom, and a substantially square surrounding webbing 34 bounded by a marginal upstanding flange 36, the latter being suitably shaped to lie within the cover or lid as defined by the depending skirt 28 extending therearound.

The annular portion of the filter element has a central aperture 37 adequate to clear the upper end of the agitator 22 during oscillation or gyration thereof. The annular trough is provided with a multiplicity of perforations 38, adapted to permit the free flow of sudsy wash water through the filter trough bottom, such holes, however, being too small to permit the passage of lint. The holes may be tapered lengthwise to facilitate molding. The annular trough to the rear thereof is provided with a symmetrical deflector 44 having side flanks 46 and 48. Such deflector member is located adjacent and forward of a rear opening 50 in the filter grid, such rear opening being adapted to align with an elongated horizontally disposed water inlet nozzle 52 projecting through the rear wall 53, of the cover well 16. The water inlet nozzle 52 is adapted to receive overflow and spillage from the tub 20 pumped from the outer tub 84 by reason of the provision of a recirculating pump 88 and pipe connections as will be hereinafter referred to (see Figure 9).

The filter element has a marginal shoulder along its rear edge as is indicated at 54 which is adapted to coact with, and be received within the skirt 28 and its inturned lower edge or flange 56 of the lid whereby to support the grid at the rear. The forward edge of the filter grid is adapted to clear the inwardly extending marginal flange 58 along the lower edge of the lid skirt at the forward edge of the lid 26. Retractable latch members 60 disposed in the grid are slidably disposed and adapted to engage the forward flange 58 of the lid skirt. Such latch members 60, there being two, are located on opposite sides of the filter grid. Each latch member slides in a guideway formed by an aperture 62 and a socket 64. The latch members are pressed forwardly by springs as at 66 and are each provided with a knurled finger actuating piece 68 extending downwardly through slots 70, in the grid. The filter grid in its forward corners is provided with bosses 72 which are adapted to engage the arcuate corner areas 17 of the depressed deck lid and thereby establish in conjunction with the rear support at 54 and 56, a level position for the filter grid when the cover is lowered. The bosses 72 are hollow and extend upwardly and are provided with spring pressed caps 74 which are adapted to yieldingly engage the under surface of the lid so as to normally urge the filter grid away from the lid. The spring caps act as snubbers, should the lid be dropped to its closed position. Once the latch members 60 are slidably released from the flange 58, the forward end of the filter will be yieldingly projected from within the lid slightly, so that one may readily grasp the grid, and remove the grid from the lid by pulling the grid forward to release its rear shoulder 54 from the flange 56. The grid is thus rendered easy to remove for quickly clearing it of lint deposited therein, and also quickly returned to its position within the lid, by inserting the rear shoulder 54 upon the flange 56, and thereafter operating the spring latches 60 to clear the flange at 58.

During washing the tub 20 may be caused to overflow through the centrifugal discharge ports 80, and the tub may also continuously drain into the outer tub 84 at a controlled rate through a small hole 82 in the bottom of the tub 20. The outer tub or splash guard 84 is provided with a drain 86, a pump 88, leading to a three-way valve 90, which may be used to cause recirculation of the overflow through the pipe 92 as during washing, or used to lead centrifugally extracted water to the drain 93, or a storage tank, for subsequent reuse.

During washing, and recirculation, the pipe 92 terminates with the nozzle 52 previously referred to. The pipe 92 leads to an elbow 104 moulded of rubber or the like, which projects through an aperture in the rear wall 53 of the deck depression. The end of the elbow is provided with a peripheral groove 106 to receive the marginal edge of the metal defining the aperture. The insertion of the mouth piece of the nozzle 52 and particularly its rear sleeve portion 99, into the elbow end expanded with the peripheral groove 106 interlocks the elbow aperture edge. The perimetral flange 101 extending around the nozzle mouth piece acts to position the mouth piece in reference to the wall 53, on insertion into the elbow, and further rigidifies the mouth piece, which due to its flat configuration, might otherwise lack sufficient rigidity to retain its elongated opening uniformly wide.

In order to safeguard against an accumulation of lint that might clog the apertures 38 and prevent recirculation, suitable overflow apertures 100 and 102 are provided. The apertures are provided with raised weir or dam-like walls 103 and 105, disposed around the apertures 100 and 102. Such walls establish a water level within the perforated filter annulus, which must be exceeded before overflow which would bypass the filter can occur. So long as the filter apertures 38 remain reasonably clear, no overflow will take place.

It will be appreciated that the capacity of the pump when acting to recirculate the wash water will always greatly exceed the rate of flow through the port 82. If desired, when the threeway valve 90 is turned for recirculation through the pipe 92, a water level sensitive device, 85, may be used to start the pump, as soon as a sufficient excess accumulation of water collects in the outer tub 84.

In practice, by recirculation of the wash fluid, heavy foreign matter may drop to the bottom of the tub and pass out with the wash water allowed to flow through aperture 82, while by means of overflow, scum and lint and lighter material will pass out through the apertures 80. All such foreign matter or overflow will, as reaches the tub 84, either through the port 82, during recirculation, be promptly delivered through pipe 92 to the nozzle 52, where such foreign matter will be discharged into the lint filter grid, to be separated from the soapy water before return to the tub 20. The grid is located within the lid, and out of the wall during washing. The lint that is caught by the tray tends to conform slightly into the apertures 38, so that when the lid is tilted, such lint does not fall out of the grid. There is thus no need to remove the grid for any purpose other than to wipe it free of collected lint and foreign matter. The grid being located in the lid is out of the way during loading or unloading of the wash tub 20. At the same time it is readily accessible when required, the grid being easily removed and replaced, by manual operation of the finger latches. The grid may be released from the lid as it is raised slightly by actuating the finger pieces 68, and the grid will then be allowed to rest on the depressed cover well 16, until the lid is raised, after which the grid can be lifted out for cleaning, or quickly wiped clear of lint, while resting in the cover well. On return of the lid to closed position, the latches 60 may automatically operate to secure the grid within the lid, in operative position.

While a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. In a washing machine, a cabinet having a top deck, a rectangular well in said deck, a circular access aperture therein, a shallow filter tray having an annular perforate bottom filter trough projecting through said aperture, and a rectangular surrounding web lying in said well, a rectangular lid disposed in said well, means to releasably secure the filter tray to said lid and a tub disposed below said access aperture and having agitating means associated therewith projecting into the center region defined by said annular trough.

2. In a washing machine, a cabinet having a top deck, a rectangular well in said deck, a circular access aperture therein, a shallow filter tray having a rectangular web engaging said well, and an annular perforate bottom trough depending through said aperture, a rectangular lid disposed in said well, means to releasably secure the filter tray to said lid a tub disposed below said access aperture and having agitating means associated therewith projecting into the center region defined by said trough, and means for recirculating wash water through said trough and tub, including a nozzle disposed beneath said deck and emptying into said trough.

3. A filter grid for attachment to and beneath the hinged lid of a vertical axis washing machine comprising an annular flat perforate bottom trough, a retaining web surrounding the upper portion of said trough and forming a part thereof, said trough having greater depth than said web, an aperture in the outer wall of said trough for receiving a stream of wash water, deflecting means disposed in the annular trough adjacent said aperture, and adapted to deflect a stream directed radially toward the center of said trough in divided opposed paths, circumferentially of said trough and an overflow aperture in said trough bottom having an overflow weir above the level of the inside trough bottom.

4. A filter grid for attachment to and beneath the hinged lid of a vertical axis washing machine comprising an annular flat perforate bottom trough, a retaining web surrounding the upper portion of said trough and forming a part thereof, said trough having greater depth than said web, an aperture in the outer wall of said trough for receiving a stream of wash water, deflecting means disposed in the annular trough adjacent said aperture, and adapted to deflect a stream directed radially toward the center of said trough in divided opposed paths, circumferentially of said trough.

5. A filter grid for attachment to and beneath the hinged lid of a vertical axis washing machine comprising an annular flat perforate bottom trough, a retaining web surrounding the upper portion of said trough and forming a part thereof, said web having yielding manually operable means adapted to releasably retain the web within and beneath a hinged lid, said trough having greater depth than said web, an aperture in the outer wall of said trough for receiving a stream of wash water, deflecting means disposed in the annular trough adjacent said aperture, and adapted to deflect a stream directed radially toward the center of said trough in divided opposed paths, circumferentially of said trough, and an overflow aperture in said trough bottom having an overflow weir above the level of the inside trough bottom.

6. A washing machine comprising a cabinet, a deck, said deck having a rectangular cover well formed therein centrally thereof, said well having a central circular access opening, a vertical axis wash tub mounted below said access opening, a substantially rectangular cover hinged along one side of said cover well, and adapted to close said aperture, said cover having a shallow marginal skirt a filter grid comprising a circular trough of greater depth than said cover skirt, and having a substantially rectangular surrounding web adapted to lie beneath and within the marginal skirt of said cover, said trough having a relatively flat perforate bottom, and means for releasably securing said grid to the cover, said trough having an outside diameter less than the diameter of said access aperture, and having a depth such as to extend below said axis aperture, and nozzle means mounted beneath said deck adjacent said well, and adapted to discharge wash fluid into the trough.

7. A washing machine comprising a cabinet, a deck, said deck having a rectangular cover well formed therein centrally thereof, said well having a central circular access opening, a vertical axis wash tub mounted below said access opening having a central oscillatory agitator projecting upward into said access opening, a substantially rectangular cover hinged along one side of said cover well, and adapted to close said aperture, said cover having a depending shallow skirt terminating in an inturned flange along its lower marginal edge, a filter grid comprising an annular trough of greater depth than said cover skirt, and having a substantially rectangular surrounding web adapted to lie beneath and within said cover and skirt, said trough having a relatively flat perforate bottom, means for releasably securing said web to the inturned flanges of said skirt, said annular trough having an outside diameter less than the diameter of said access aperture, and having a depth such as to extend through and below said axis aperture, and said annular trough having an internal diameter of sufficient diameter to clear the upper end of said agitator, and means to re-circulate wash water through the perforate bottom of said trough.

8. A washing machine comprising a cabinet, a deck, said deck having a rectangular cover well formed therein centrally thereof, said well having a central circular access opening, a vertical axis wash tub mounted below said access opening having a central oscillatory agitator projecting upward into said access opening, a substantially rectangular cover hinged along one side of said cover well, and adapted to close said aperture, said cover having a shallow marginal skirt a filter grid comprising an annular trough of greater depth than said cover skirt, and having a substantially rectangular surrounding web adapted to lie beneath and within said cover and skirt, said trough having a relatively flat perforate bottom, means for releasably securing said web to and beneath said cover, said annular trough having an outside diameter less than the diameter of said access aperture, and having a depth such as to extend below said axis aperture, and said annular trough having an internal diameter of sufficient diameter to clear the upper end of said agitator, a nozzle mounted beneath said deck adjacent said well, and adapted to discharge horizontally toward the center of said access opening, and an aperture in the outside wall of said annular trough adapted to be aligned with said nozzle, when said cover lies in said cover well.

9. A washing machine comprising a cabinet, a deck, said deck having a rectangular cover well formed therein centrally thereof, said well having a central circular access opening, a vertical axis wash tub mounted below said access opening having a central oscillatory agitator projecting upward into said access opening, a substantially rectangular cover hinged along one side of said cover well, and adapted to close said aperture, said cover having a depending shallow marginal skirt terminating in an inturned flange along its lower marginal edge, a filter grid comprising an annular trough of greater depth than said cover skirt, and having a substantially rectangular surrounding web adapted to lie beneath and within said cover and skirt, said trough having a relatively flat perforate bottom, means for releasably securing said web to the inturned flanges of said skirt, said annular trough having an outside diameter less than the diameter of said access aperture, and having a depth such as to extend through and below said axis aperture, and said annular trough having an internal diameter of sufficient diameter to clear the upper end of said agitator, a nozzle mounted beneath said deck adjacent said well, and adapted to discharge horizontally toward the center of said access opening, an aperture in the outside wall of said annular trough adapted to be aligned with said nozzle, when said cover lies in said cover well, and means for recirculating wash water from said tub to said nozzle, whereby to direct recirculated water into said trough for filtration of foregn matter therefrom in passage through the perforate bottom of said trough.

10. In a washing machine, a cabinet having a top deck, a shallow cover well in said deck to accommodate a lid, an access aperture in the well of lesser area than said well, a filter tray having a shallow side wall adapted to extend through the aperture and a perforate bottom, said side wall having a surrounding upper flange adapted to seat in said well, a lid disposed in said well, means to releasably secure said filter tray to said lid, an aperture in the side wall of said tray, a tub disposed below said access opening, and means for circulating water from said tub and through said side aperture into said tray.

References Cited in the file of this patent

UNITED STATES PATENTS

| 840,400 | Tipton | Jan. 1, 1907 |
| 2,298,096 | Dunham | Oct. 6, 1942 |
| 2,536,087 | Powers et al. | Jan. 2, 1951 |
| 2,554,229 | Woodson | May 22, 1951 |
| 2,792,701 | Bochan | May 21, 1957 |